United States Patent [19]

Tilch et al.

[11] Patent Number: 4,749,288

[45] Date of Patent: Jun. 7, 1988

[54] SUPPORT FOR ROLLING BEARING

[75] Inventors: Gerhard Tilch; Paul-Gerhard Hoch, both of Schweinfurt; Uwe Brockmüller, Oberwerrn, all of Fed. Rep. of Germany

[73] Assignee: SKF GmbH, Schweinfurt, Fed. Rep. of Germany

[21] Appl. No.: 915,117

[22] Filed: Oct. 3, 1986

[30] Foreign Application Priority Data

Oct. 15, 1985 [DE] Fed. Rep. of Germany ....... 3536697

[51] Int. Cl.$^4$ ............... F16C 43/04; F16C 35/00; F16B 35/04; F16L 23/00
[52] U.S. Cl. .................... 384/584; 384/428; 384/542; 384/585; 403/7; 403/337; 411/380; 411/537
[58] Field of Search .............. 384/584, 585, 428, 456, 384/513, 515, 537, 542–544, 559, 560, 564, 569; 180/70.1; 464/178; 403/6, 7, 337; 411/537, 538, 380, 381; 248/903

[56] References Cited

U.S. PATENT DOCUMENTS

| 1,924,937 | 8/1933 | Leister | 384/513 |
|---|---|---|---|
| 2,272,118 | 2/1942 | Imse et al. | 384/206 |
| 2,978,253 | 4/1961 | Weiss et al. | 411/537 X |
| 3,999,815 | 12/1976 | Dauwalder | 384/584 |
| 4,396,236 | 8/1983 | Asberg | 384/537 |
| 4,408,809 | 10/1983 | Walter et al. | 384/486 |
| 4,537,270 | 8/1985 | Brandenstein et al. | 384/537 X |

Primary Examiner—Stuart S. Levy
Assistant Examiner—Thomas R. Hannon
Attorney, Agent, or Firm—Rosen, Dainow & Jacobs

[57] ABSTRACT

A support for a rolling bearing is provided with an essentially annular transition region between sleeve-shaped portion and a flange connected thereto, the flange having a plurality of circumferentially distributed, axially extending mounting holes. The transition region has a concavely curved or linearly inclined profile. A substantially spherical base surface is provided axially of each mounting hole, the base surface connecting the rim of the hole with the inner surface of a substantially part-cylindrical recess in the transition region, the recess having a diameter greater than the hole diameter.

4 Claims, 2 Drawing Sheets

SUPPORT FOR ROLLING BEARING

FIELD OF THE INVENTION

This invention relates to a support for a rolling bearing of the type having a sleeve-shaped portion with at least one raceway for rolling bodies and an integrally formed flange with circumferentially distributed, axially directed mounting holes.

BACKGROUND OF THE INVENTION

A support of the foregoing type is disclosed in U.S. Pat. No. 4,396,236. This reference relates to a rolling bearing unit for vehicle wheels, wherein rows of rolling bodies are arranged between two bearing rings. The outer ring as well as the inner ring are provided with flanges or the like, by means of which the rolling bearing unit is mounted, i.e. the wheel is supported. The flange of the outer ring, which is integrally formed with the sleeve-shaped raceway portion of the outer ring, is provided with circumferentially distributed, axially directed threaded mounting holes for attachment. In the case of frequent strong impulsetype loads, transmitted from the wheel of the vehicle to the rolling bearing during operation, strong torques occur in addition to the purely radial force components, whereby one or more bolts transmit the entire load as an axial force on a relatively small peripheral portion of the flange. Consequently the flange undergoes, particularly in the area of the threaded holes, strong bending stresses in relation to the raceway portion, which constantly change during rotation of the wheel. For this reason the material, particularly in the transition region between the flange and the sleeve-shaped portion, is subjected to severe fatigue stresses, which can lead relatively prematurely to cracks in this area and failure of the rolling bearing unit. In order to resist fracture formation, the transition region, particularly in the area of the annular juncture between the flange and the sleeve-shaped portion, should be formed without a sharp corner; on the contrary, a rounding of small radius should be provided, which rounding is generally automatically produced by machining. In the embodiment depicted in the cited prior art reference, the flange as well as the raceway portion are slightly conically sloping. The two conical surfaces meet each other in a more or less sharp corner and consequently lead to the aforementioned disadvantage.

The same problem arises in the area of the threaded holes. In order to make it possible to form the threads, recesses are formed in the sleeve-shaped raceway portion axially of the flange, the recesses being sleeve-shaped bores with flat bottoms. The flat bottom surfaces also merge with the partly cylindrical inner surfaces of the recesses by way of sharp transitions. In this way in the area of each threaded hole there is the danger of the formation of a stress fracture and hence the danger of failure of the rolling bearing arrangement.

The above-described disadvantage can be found in all rolling bearings (i.e. rolling bearing arrangements) when, for example, the outer or inner rings comprise separate machine parts and are supported by corresponding supports having sleeve-shaped and flange-shaped parts.

SUMMARY OF THE INVENTION

The object of the invention is to improve the support of a rolling bearing of the above-described type whereby a light and material-saving construction is still able to withstand high loads.

This object is realized in accordance with the invention by providing a substantially annular transition region between one of the side surfaces of the flange and the outer circumferential surface of the sleeve-shaped portion, the transition region being formed as a flaring with a profile that is concave curved or linearly inclined. A substantially spherically curved base surface is provided axially of each mounting hole, the base surface connecting the rim of the hole with the inner surface of the substantially part-cylindrical recess, said recess having a diameter greater than that of the mounting hole.

As a result all highly loaded and failure-susceptible areas of the support are provided with continuous material transitions. As a consequence of the sharply curtailed bending strain, the loading is partially transmitted from the loading center in the area of the mounting holes along the perimeter of the true flange to the sleeve-shaped portion by way of the transition region. This novel construction further produces, as a result of the absence of sharp corners in the transition region, a continuous change in the diffusion of stress in the material and build-up of local stress concentration in the flange area is blocked. Particularly for pulse-type loading, this avoids impermissibly large strain in any one zone of material. The transition region between the flange and the sleeve-shaped portion can, depending on the stability requirements, have either a concave profile or, in the case of extreme loading, a linear profile. In the latter case, however, a continuous transition into the sleeve-shaped portion of the support should be produced, perhaps through an annular portion having a concave curved profile of relatively large radius. It is understood that it is also possible to have a flared gradient comprising a plurality of different radii or a more complex gradient of higher order. The support in accordance with the invention can be provided with raceways for rolling bodies formed as well as with separate bearing races. Furthermore the invention is applicable where raceways are formed on the inner ring and a cage takes the place of raceways on the outer ring. Moreover, the flange can arbitrarily be radially inwardly or outwardly directed and also can optionally be located between the ends of the raceway rings, with a transition region being provided on both sides. The aforementioned advantages arise for all of these constructions.

In accordance with a further advantageous feature of the invention, the transition region extends from the rim of the flange and proceeds to curve with progressively increasing radius toward the outer circumferential surface of the sleeve-shaped portion. As a result a particularly smooth transition over the entire height of the flange is produced which is suitable for undergoing high loads.

In accordance with a further preferred embodiment, the inner surface of the part-cylindrical recess and the peripheral surface of the sleeve-shaped portion have a common axially extending generated surface. At the same time the radial location and diameter of the recesses are chosen such that, on the one hand, the greatest possible proximity to the sleeveshaped portion is attained and, on the other hand, the wall thickness is not weakened. In doing so, in the case of torque with regard to the radial location of the mounting holes, a relatively small moment is produced while material distribution is optimized for the greatest possible rigidity.

BRIEF DESCRIPTION OF THE DRAWINGS

The preferred embodiment of the invention will be described in detail with reference to the accompanying drawings, wherein.

DETAILED DESCRIPTION OF THE PREFERRED EMBODIMENT

Figure 1:
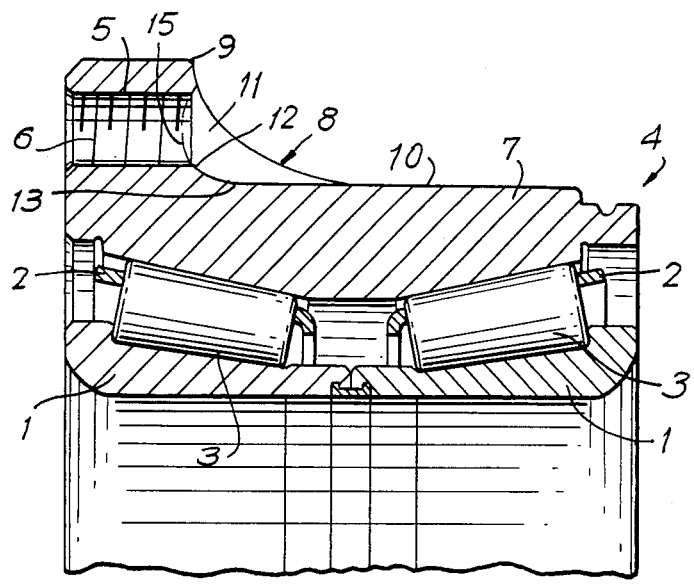
FIG. 1 is a partial longitudinal sectional view of the rolling bearing arrangement with a flange formed on the outer ring.

The rolling bearing arrangement shown in FIG. 1 comprises two interconnected inner rings 1, an outer ring 4 having two raceways and integrally formed with a radially outwardly directed flange 5, and two rows of tapered rollers 3 guided by respective cages 2 between the outer rings and separate ones of the inner rings. The flange 5 is provided with a plurality of circumferentially distributed, axially directed mounting holes 6, each hole having an internal thread. Only one of the plurality of holes 6 is depicted in the drawings. An essentially annular flared curved transition region 8 is provided between the flange 5 and the sleeve-shaped portion 7 of the outer ring 4, which transition region ensures an especially strong connection of the flange 5 and the sleeve-shaped portion 7.

Figure 3:
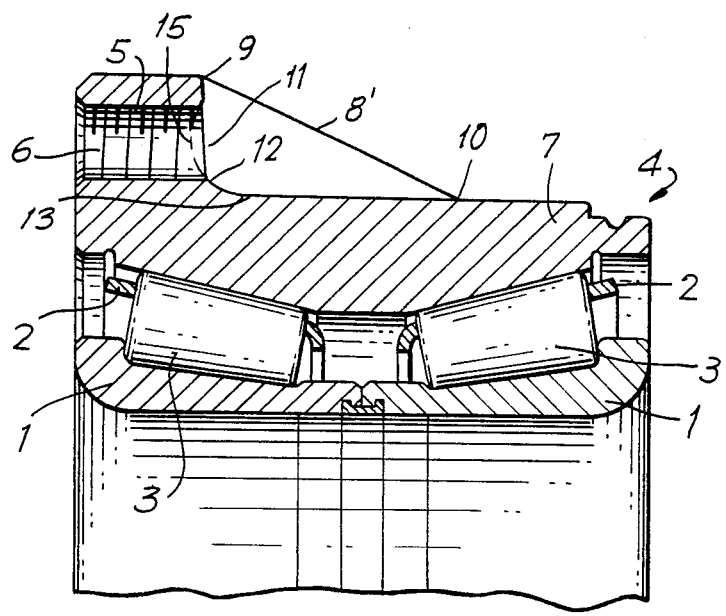
FIG. 3 illustrates a modification of FIG. 1.

The transition region 8 extends from the outer rim 9 of the flange 5 and proceeds to curve with progressively increasing radius toward the outer surface 10 of the sleeve-shaped portion 7. Axially of the mounting holes 6, part-cylindrical recesses 11 of somewhat greater diameter are formed in the transition region 8. The base surfaces 12 of the part-cylindrical recesses 11, arranged at the right-hand ends (as viewed in FIG. 1) of the respective mounting holes, are concave and run from the respective rims of the mounting holes 6 in the shape of a substantially spherical surface in the adjacent material portions of the flange 5 and transition region 8. As an alternative, as shown in FIG. 3, the transition region may be linear as at 8'. The transition into the part-cylindrical recess 11 is smooth and gradual like that of the transition region 8 itself with the sleeve-shaped portion 7. The radial arrangement of the mounting holes 6 and the partcylindrical recesses 11 extending substantially coaxial therewith and furthermore their diameters, are selected such that the axial generating line 13 of the recess 11 lying closest to the center axis of the rolling bearing arrangement verges level with the outer surface 10 of the sleeve-shaped portion. This yields a straight transition line.

Figure 2:
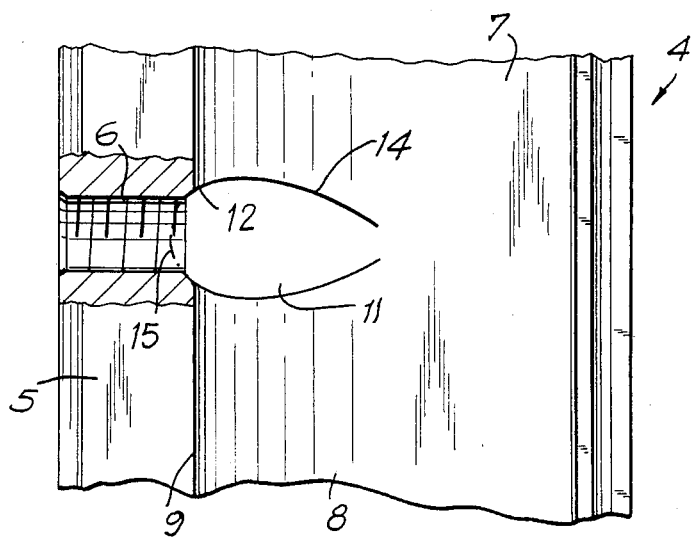
FIG. 2 is a partial top view of the region around the mounting bore of the rolling bearing arrangement depicted in FIG. 1, partially sectioned.

FIG. 2 shows a top view of the rolling bearing arrangement in the area of a mounting hole 6. The part-cylindrical recess 11 is shown in this view as meeting the transition region 8 along a substantially drop-shaped juncture. The base surface 12 of the part-cylindrical recess 11 is concave and hollow. To better understand the invention, the non-existent portion of the base surface 12 in the area of the mounting bore appears as a curved connecting line 15 indicated by dot-dash lines in FIGS. 1 through 3, within the rim of the bore.

The foregoing description of the preferred embodiment is presented for illustrative purposes only and is not intended to limit the scope of the invention as defined in the appended claims. Modifications may be readily effected by one having ordinary skill in the art without departing from the spirit and scope of the inventive concept herein disclosed.

What is claimed is:

1. In a support for a rolling bearing, having a sleeve-shaped portion with at least one raceway for rolling bodies and a flange formed thereon, said flange having circumferentially distributed, axially extending mounting holes each having a rim at one end thereof, the improvement wherein an essentially annular transition region is provided between a side surface of said flange and a circumferential surface of said sleeve-shaped portion, said transition region having a longitudinal profile which is concavely cured, a recess having an inner surface is provided axially of each said hole, and wherein a base surface having a section of a substantially spherical surface is provided axially of each mounting hole, each base surface connecting the rim of the corresponding mounting hole with the inner surface of a recess in said transition region forming a section of a substantially cylindrical surface, said recess having a diameter greater than the diameter of said corresponding mounting hole.

2. In a support for a rolling bearing, having a sleeve-shaped portion with at least one raceway for rolling bodies and a flange formed thereon, said flange having circumferentially distributed, axially extending mounting holes each having a rim at one end thereof, the improvement wherein an essentially annular transition region is provided between a side surface of said flange and a circumferential surface of said sleeve-shaped portion, said transition region having a longitudinal profile which is concavely curved, a recess having an inner surface is provided axially of each said hole, and wherein a base surface having a section of a substantially spherical surface is provided axially of each mounting hole, each base surface connecting the rim of the corresponding mounting hole with the inner surface of a recess in said transition region forming a section of substantially cylindrical surface, said recess having a diameter greater than the diameter of said corresponding mounting hole, said flange having a rim, said transition region extending from the rim of said flange with progressively increasing radius and verging into the circumferential surface of said sleeve-shaped portion.

3. In a support for a rolling bearing, having a sleeve-shaped portion with at least one raceway for rolling bodies and a flange formed thereon, said flange having circumferentially distributed, axially extending mounting holes each having a rim at one end thereof, the improvement wherein an essentially annular transition region is provided between a side surface of said flange and a circumferential surface of said sleeve-shaped portion, said transition region having a longitudinal profile which is concavely curved, a recess having an inner surface is provided axially of each said hole, and wherein a base surface having a section of a substantially spherical surface is provided axially of each mounting hole, each base surface connecting the rim of the corresponding mounting hole with the inner surface of a recess in said transition region forming a section of a substantially cylindrical surface, said recess having a diameter greater than the diameter of said corresponding mounting hole, the inner surface of said part-cylindrical recess and the circumferential surface of said sleeve-shaped portion having a common axially extending generating line.

4. In a support for a rolling bearing, having a sleeve-shaped portion with at least one raceway for rolling bodies and a flange formed thereon, said flange having circumferentially distributed, axially extending mounting holes each having a rim at one end thereof, the improvement wherein an essentially annular transition region is provided between a side surface of said flange and a circumferential surface of said sleeve-shaped portion, said transition region having a longitudinal profile which is linearly inclined, a recess having an inner surface is provided axially of each said hole, and wherein a base surface having a section of a substantially spherical surface is provided axially of each mounting hole, each base surface connecting the rim of the corresponding mounting hole with the inner surface of a recess in said transition region forming a section of a substantially cylindrical surface, said recess having a diameter greater than the diameter of said corresponding mounting hole.

* * * * *